(12) United States Patent
Paetzold et al.

(10) Patent No.: US 7,442,824 B2
(45) Date of Patent: Oct. 28, 2008

(54) PROCESS AND APPARATUS FOR THE HYDROGENATION OF CHLOROSILANES

(75) Inventors: Uwe Paetzold, Burghausen (DE); Anton Reisbeck, Haiming (DE); Manfred Surner, Triftern (DE)

(73) Assignee: Wacker Chemie AG, Munich (DE)

( * ) Notice: Subject to any disclaimer, the term of this patent is extended or adjusted under 35 U.S.C. 154(b) by 72 days.

(21) Appl. No.: 11/526,963

(22) Filed: Sep. 26, 2006

(65) Prior Publication Data

US 2007/0073075 A1 Mar. 29, 2007

(30) Foreign Application Priority Data

Sep. 29, 2005 (DE) .................. 10 2005 046 703

(51) Int. Cl.
*C07F 7/00* (2006.01)

(52) U.S. Cl. ..................................... 556/466
(58) Field of Classification Search ............. None
See application file for complete search history.

(56) References Cited

U.S. PATENT DOCUMENTS

| 3,459,504 A | 8/1969 | Bracken et al. |
| 3,645,686 A | 2/1972 | Tucker et al. |
| 3,933,985 A | 1/1976 | Rodgers et al. |
| 4,194,028 A | 3/1980 | Sirtl et al. |
| 4,217,334 A | 8/1980 | Weigert et al. |
| 4,373,006 A | 2/1983 | Galasso et al. |
| 4,536,642 A | 8/1985 | Hamster et al. |
| 4,668,493 A | 5/1987 | Levin et al. |
| 4,702,960 A | 10/1987 | Ogman et al. |
| 4,737,348 A | 4/1988 | Levin et al. |
| 5,422,088 A | 6/1995 | Burgie et al. |
| 5,906,799 A | 5/1999 | Burgie et al. |

FOREIGN PATENT DOCUMENTS

| DE | 27 39 258 A1 | 3/1979 |
| DE | 30 24 320 A1 | 4/1982 |
| DE | 27 39 258 C2 | 6/1985 |
| DE | 43 17 905 C2 | 3/2003 |
| EP | 0 294 047 A1 | 12/1988 |
| EP | 1 454 670 A1 | 9/2004 |
| WO | 2006/081982 A2 | 8/2006 |

OTHER PUBLICATIONS

US 5,906,799 is corresponding to DE 43 17 905 C2, 1999.
US 4,194,028 is corresponding to DE 27 39 258 C2, 1980.
US 4,536,642 is corresponding to DE 30 24 320 A1.
US 4,194,028 is corresponding to DE 27 39 258 A1.

*Primary Examiner*—Samuel A Barts
(74) *Attorney, Agent, or Firm*—Brooks Kushman P.C.

(57) ABSTRACT

Hydrogenation of a chlorosilane takes place in a reactor having a graphite reaction chamber with a surface which contacts the chlorosilane and a graphite electric heating element which also contacts the chlorosilane, wherein an Si-containing compound and hydrogen are contacted with the reaction chamber and the heating element such that an SiC coating is formed in situ on their surfaces in a first process step, and hydrogenation of the chlorosilane is effected by heating of a chlorosilane/hydrogen mixture in the reaction chamber by means of the heating element in a second process step, the first process step carried out at a reaction temperature which is higher than the reaction temperature of the second process step.

17 Claims, 1 Drawing Sheet

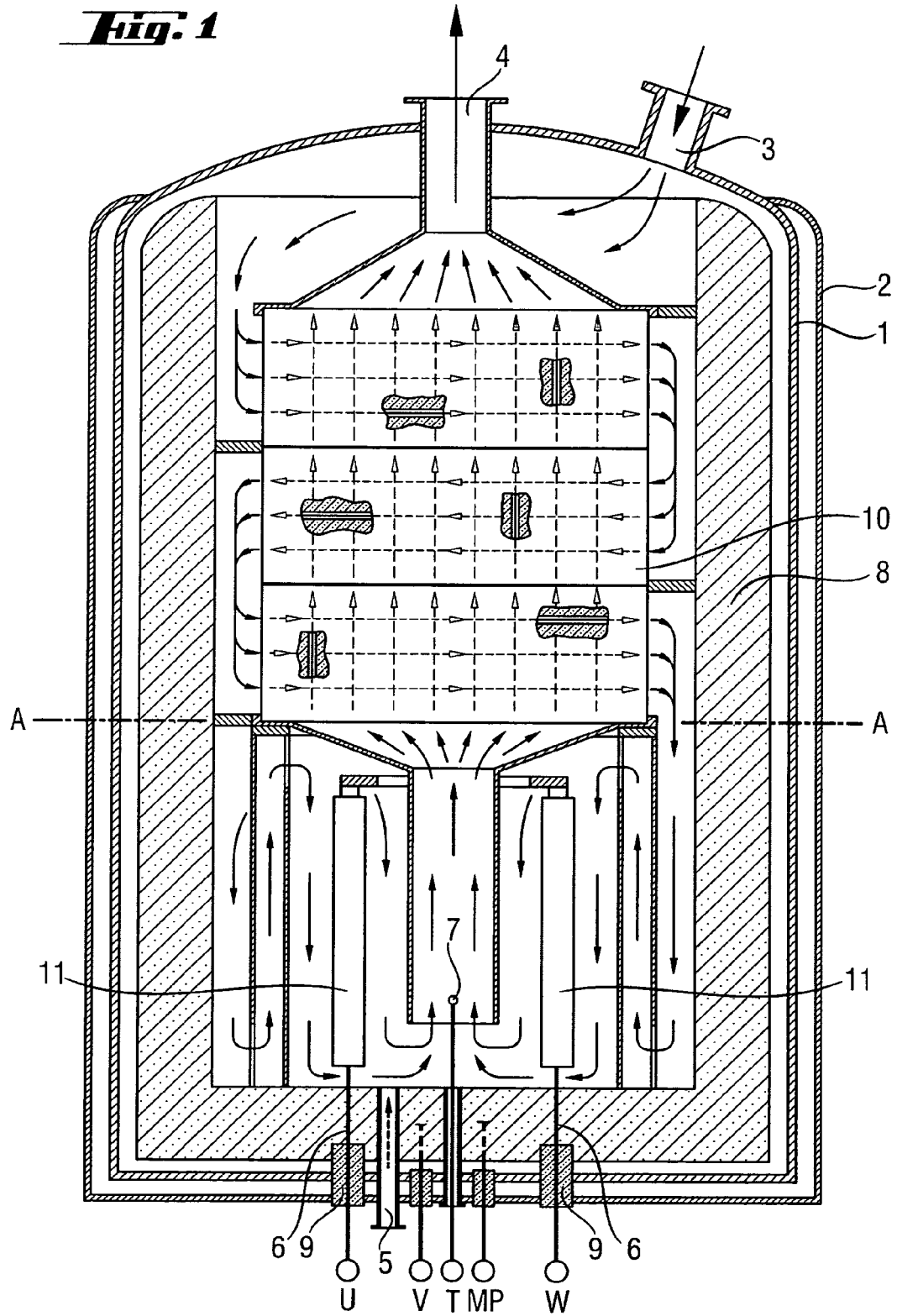

PROCESS AND APPARATUS FOR THE HYDROGENATION OF CHLOROSILANES

BACKGROUND OF THE INVENTION

1. Field of the Invention

The invention relates to a process and an apparatus for the hydrogenation of chlorosilanes.

2. Background Art

Processes for the hydrogenation of chlorosilanes at temperatures of >600° C. are known. For example, the hydrogenation of silicon tetrachloride (STC) to trichlorosilane (TCS) has great importance, since large amounts of STC are obtained as by-product in the chemical vapor deposition of semiconductor silicon and STC can be converted back into TCS starting material by means of these processes. Such processes are described, for example, by U.S. Pat. No. 5,422,088 (Burgie et al.), U.S. Pat. No. 3,933,985 (Rogers), U.S. Pat. No. 4,217,334 (Weigert et al.), U.S. Pat. No. 4,536,642 (Hamster et al.) and also by the references cited in these documents.

In all these processes, graphite is used as material of construction for the reactor components, insulation material and heating elements because of its particular mechanical, electrical and chemical properties. U.S. Pat. No. 3,645,686 (Tucker) recognized that the use of graphite electrodes can introduce impurities, e.g. boron, phosphorus, arsenic and antimony, into the semiconductor product. EP 0294047 (McCormick) recognized that contact of graphite with hydrogen at >500° C. can lead to formation of hydrocarbons which leads to the introduction of carbon-containing impurities (methylsilanes) into the product. To avoid the introduction of impurities, it has been proposed that the graphite components be coated with silicon carbide (SiC). The deposition of SiC layers can be effected by means of known CVD processes, for example as described in U.S. Pat. No. 3,459,504 (Bracken) or DE 2379258 (Sirtl).

U.S. Pat. Nos. 4,668,493, 4,702,960, 4,373,006, 4,737,348, and EP 1454670 describe reactors based on SiC-coated carbon material which are used for reactions at high temperatures in the presence of chlorosilanes. With this prior art, as a starting point, DE 4317905 (Burgie et al.) developed an improved reactor for the hydrogenation of chlorosilanes at temperatures of >600° C., having a reaction chamber and heating elements comprising SiC-coated carbon material. A chlorosilane/hydrogen mixture is passed through the reaction chamber. The heating elements are located outside the reaction chamber and do not come into contact with the reaction mixture, the reaction mixture being heated via the walls of the chamber. The heating elements and reactor walls have to reach temperatures of 1600° C. in order to maintain the temperature of 800-1200° C. which is preferred for the hydrogenation of STC in the reaction chamber. This process thus requires an energy input which is higher than that which would be required for the reaction. A higher reactor temperature results in further undesirable effects such as high thermal stress on the components and heating elements, increased corrosion of the components caused by chemical attack by hydrogen, chlorosilanes and HCl, and also deposition of silicon at undesirable places.

SUMMARY OF THE INVENTION

It is an object of the invention to provide a process for the hydrogenation of chlorosilanes which avoids introduction of impurities into the reaction and can be operated more simply and/or in a more energy-efficient manner than known processes which avoid such contamination. These and other objects are achieved by a process for the hydrogenation of a chlorosilane in a reactor comprising a reaction chamber having a surface which comes into contact with the chlorosilane and a heating element which is heated by direct passage of electric current and has a surface which comes into contact with the chlorosilane, with the reaction chamber and the heating element comprising graphite, wherein an Si-containing compound and hydrogen are brought into contact with the surface of the reaction chamber and the surface of the heating element in such a way that an SiC coating is formed in situ on the surface of the reaction chamber and the surface of the heating element in a first process step and hydrogenation of the chlorosilane is effected by heating of a chlorosilane/hydrogen mixture in the reaction chamber by means of the heating element in a second process step, with the first process step being carried out at a reaction temperature which is higher than the reaction temperature in the second process step.

BRIEF DESCRIPTION OF THE DRAWINGS

FIG. 1 shows an embodiment of a reactor according to the invention, as has also been used in the examples.

DETAILED DESCRIPTION OF THE PREFERRED EMBODIMENT(S)

For the purposes of the present invention, chlorosilanes are compounds of the general formula $R_nSiCl_{4-n}$, where the radicals R are identical or different and are each hydrogen or an organic radical, and n is 0, 1, 2 or 3. The radical R is preferably H or an alkyl group $C_nH_{2n+1}$, more preferably —H or —$CH_3$. R is most preferably —H. n is preferably 0, 1 or 2, most preferably 0. The chlorosilane is thus most preferably tetrachlorosilane.

For the purposes of the present invention, an Si-containing compound is a compound of the general formula $X_3Si$—Y, where X=—H, —Cl or an alkyl radical and Y=H, Cl, —$SiX_3$ or —$OSiX_3$. It is preferably a chlorosilane, most preferably, the chlorosilane which is used as starting material in the second process step.

The process of the invention makes it possible to combine two known, independent processes, namely the coating of graphite components and the hydrogenation of a chlorosilane, in one reactor. Since both process steps take place in the same reactor without the reactor having to be modified, an additional outlay is avoided. The direct contacting according to the invention of the heating elements with an Si-containing compound results in in-situ coating of the heating elements, the reactor wall and, if appropriate, further internals in the region of the reaction zone within the reactor. This SiC layer formed in situ forms a chemically inert protective layer, reduces chemical attack on the reactor surface or the heater surface by the reaction gases and reduces undesirable secondary reactions, for example the formation of hydrocarbons, methylchlorosilanes and the conversion of TCS back into STC in relatively cold regions of the reaction zone.

Compared to the single-stage mode of operation as is known, for example, from U.S. Pat. Nos. 5,422,088 or 4,536,642, the process of the invention makes possible longer reactor operating periods, a reduced introduction of contaminants and, associated therewith, a higher purity of the reaction products as well as higher reaction yields. The reduced contamination with impurities, for example B and P compounds and methylchlorosilanes, also leads to a lower outlay in terms of apparatus and energy for the subsequent purification of the reaction products, which is preferably carried out by means of distillation.

In the first process step, a silane which can be vaporized at a temperature of <250° C. and is selected from the group consisting of chlorosilanes ($SiH_zCl_{4-z}$), disilanes ($Si_2H_zCl_{6-z}$), disiloxanes ($Si_2OH_zCl_{6-z}$) and methylchlorosilanes (z is an integer from 0 to 6) is preferably used as Si-containing compound. Silane-containing by-products, for example dichlorosilane from the synthesis of trichlorosilane or the deposition of polycrystalline silicon by means of the Siemens process or methylchlorosilanes from the Müller-Rochow synthesis or waste products from the abovementioned processes, e.g. various high-boiling fractions which comprise disilanes or disiloxanes, can advantageously be used as Si-containing compound in the first process step, since these compounds can in this way be utilized in an economically advantageous manner instead of having to be disposed of.

The hydrogen required in the first process step is preferably used in the form of pure hydrogen. However, it is also possible to use hydrogen in the form of a hydrogen-containing offgas such as is obtained in the synthesis of trichlorosilane or the deposition of polycrystalline silicon by means of the Siemens process. It is possible to use unpurified hydrogen from these processes which still contains HCl and chlorosilanes.

The Si-containing compound and the hydrogen are fed into the reactor in a molar ratio (silane:hydrogen) of from 2:1 to 1:10, preferably in a molar ratio of from 2:1 to 1:2.

The coating of the components takes place at reactor temperatures of >1000° C., preferably in the temperature range 1000-1600° C. It is important in the process that the temperature in this coating step is higher than in the subsequent hydrogenation step. This process step is carried out at pressures of 1-20 bar, preferably 1-5 bar. The first process step is preferably carried out at a reactor pressure which is lower than in the hydrogenation reaction, since a lower pressure is favorable for layer formation.

The formation of the SiC coating can be monitored indirectly via the change in the electric resistance of the heating elements, since SiC has a higher resistance than the base material graphite. This makes it possible to regulate and control the coating process via measurement of the electric resistance of the heating elements.

The reaction parameters, preferably the temperature, the pressure in the reactor, the composition of the feed and the coating time (generally 1-7 days), are selected as a function of the desired layer thickness.

After conclusion of the in-situ coating with SiC in the first process step, the reactor can, without engineering modifications, be switched over to the reaction parameters of the subsequent second process step, viz. the hydrogenation reaction.

The reactor is preferably operated using the same composition of the feed during the hydrogenation reaction as during the coating step. For example, if STC and pure hydrogen have been used in the coating step, STC and pure hydrogen are preferably used in the hydrogenation step as well.

The hydrogenation step is preferably carried out at a temperature of 700-1400° C., preferably 900-1200° C. Since the hydrogenation step is generally not pressure-dependent this reaction can be carried out within a wide pressure range, preferably 5-20 bar. The hydrogenation step is preferably carried out at both a lower temperature and a higher pressure than the preceding coating step.

It is possible to use different starting materials in the hydrogenation reaction than in the coating step. Preference is given to using STC, chlorodisilanes or methyltrichlorosilane. Particular preference is given to using the same starting materials in the coating step and in the hydrogenation reaction.

Depending on the purity requirements which the hydrogenated product has to meet, various hydrogen sources can also be utilized here. Thus, pure hydrogen or purified hydrogen from the offgases from the synthesis of TCS or the deposition of polycrystalline silicon by means of the Siemens process will preferably be used for the preparation of TCS for semiconductor applications.

In the hydrogenation step, the starting materials chlorosilane and hydrogen are preferably used in a ratio at which the hydrogen is present in excess. Particular preference is given to a ratio of hydrogen:chlorosilane of from 1.5:1 to 5:1.

An advantage of the process of the invention compared to the prior art is that the heating elements no longer have to be separated physically from the reaction zone. The construction costs are thus lower and more efficient energy input directed at the product is ensured. As a result of the deliberate in-situ coating in the first process step of components which come into contact with the product, all components which are normally attacked by the corrosive atmosphere are provided with a protective layer. This leads to an increase in the operating life of the components concerned and to reduced introduction of contaminants into the target product, since reaction of the graphite components with the reaction gases can no longer take place. Due to the coating of the components with SiC in the first process step, uncontrolled deposition of silicon on the heating elements and/or graphite components in the second process step no longer leads to the previously observed cracks or fractures in the components even in the event of large temperature fluctuations in the reactor. Furthermore, undesirable reactions catalyzed by graphite, e.g. the conversion of TCS back into STC in relatively cold regions of the reaction zones, are avoided as a result of the in-situ coating of the components, since SiC is catalytically inactive.

The invention further provides a reactor which is used for carrying out the process of the invention. The process of the invention is preferably carried out in a reactor as is known from U.S. Pat. No. 4,536,642 A. A preferred reactor is shown in FIG. 1. It comprises a pressure-rated, cylindrical metal housing (1) which is provided with cooling in the form of a jacket (2) for the cooling medium and has a gas inlet opening (3) and a gas outlet opening (4) and inert resistance heaters (11) which are located between these openings and are heated by direct passage of current and are connected in a star in a symmetrical multiphase AC system and with their surfaces brought to temperature bound or occupy spaces through which the gases to be heated flow, with all resistance heaters being arranged upright in the housing and being connected electrically to one another at their upper end and each being provided at their lower end with electrical leads (6) which lead through openings (9) through the baseplates which are insulated from the housing (1) and cooling (2), with the resistance heaters (11) comprising connected tubes or cylinders through which forced flow occurs and which end in an electrically conductive collector which goes over into the gas outlet, with a heat exchanger unit (10) comprising electrically unheated gas discharge lines being fitted between the arrangement of the resistance heaters (11) and the gas outlet opening (4) in the housing and, in addition, a temperature measurement device (T/7) and an additional gas inlet opening (5) opening into the reactor through the baseplate and high-temperature thermal insulation (8) being located between the metal housing (1) and the resistance heaters (11) or heat exchanger unit (10).

In a reactor according to the invention, the surfaces of the reactor which come into contact with a feed gas or a product gas are provided with a layer of SiC formed in situ. Because of the in situ deposition, the SiC layer will be different from layers produced by conventional means.

All heat- and pressure-resistant steels which are customary in apparatus construction, for example stainless steels, can be used for the metal housing. Possible cooling media are all customary cooling media, for example inexpensive cooling water.

The high temperatures necessary for the process of the invention make high-temperature thermal insulation (8) in the interior of the metal housing necessary in order to protect the metal housing. This insulation preferably comprises heat- and corrosion-resistant materials, preferably graphite felt or graphite sheet, which are arranged in layers. The outer layer in each case is preferably a graphite sheet which exhibits particularly good heat radiation reflectivity.

For energy to be utilized as effectively as possible, the reactor is divided into a heat-exchange zone and a reaction zone (FIG. 1, above and below, respectively, line A-A). Within the heat-exchange zone, the heat exchanger is preferably arranged so that it ensures optimal heat exchange between the hot reaction offgas/product gas flowing out and the cold feed gas flowing in.

The heat exchanger preferably consists of an inert material. It is provided with numerous holes which are arranged transverse to the flow and have a diameter which can vary in the range of 1 to 30 mm. Holes having a diameter of <15 mm have been found to be advantageous. A graphite material is preferably used for the heat exchanger.

To increase the efficiency of the heat exchanger, the heat exchanger can consist of individual parts which are then preferably assembled to form a cylindrical total unit. Preference is given to 1-20 parts of this type forming a total unit which, owing to the upright arrangement and structural design, has a negligible idle current.

The outflowing gas leaves the reactor in a cooled state for further condensation and the feed gas flowing out of the heat exchange zone travels, in an appropriately preheated state and uniformly distributed, directly into the reaction zone in which it comes into direct contact with the symmetrically arranged heating elements (11). The heating elements are configured as plates, lamellae, rods or tubes, with or without additional radial openings, and can be arranged as a group of from 5 to 50.

Compared to the process without in-situ coating, a smaller number of heating elements is sufficient, since these can be operated at a higher temperature after coating. Owing to the larger contact area, the use of tubes, which can be provided with radial holes, as heating elements has been found to be advantageous. To obtain a homogeneous temperature distribution, the heating elements are, with the aid of their previously determined resistance, arranged so that they are arranged symmetrically, based on the resistance distribution in the heater circuit.

The heating elements are configured as electric resistance heating and, like the heat exchangers, preferably consist of graphite or other materials based on carbon. Graphite is preferably used in isostatically pressed or in extruded form or in the form of fiber-reinforced graphite (CFC). A differing porosity of the material used is advantageously evened out by the coating process.

The additional gas inlet opening (5) in the lower region of the reactor makes it possible to additionally introduce feed gas. The electric leads to the heating elements are preferably provided with cooling facilities and electrically insulating inserts (9). These insulators likewise consist of chemically inert materials. They can comprise plastics, ceramics or fused silica, with preference being given to using PTFE and fused silica or a combination of the two materials.

A precise temperature measurement for the reaction during the in-situ coating is very desirable. A measurement system which permits determination of the temperature even at >1600° C. and measures the gas temperature of the reaction components within the reaction zone without a time delay has been found to be advantageous for this purpose. The measurement system projects into the reaction zone and consists of an inert material which prevents chemical attack. Such materials are preferably materials based on silicon carbide or silicon nitride.

Furthermore, the reactor is provided with an additional feed point for starting materials (chlorosilanes and hydrogen) directly into the reaction zone in order to be able to influence the reaction parameters in an advantageous way. It is thus made possible to feed starting materials directly into the reaction space, bypassing the heat exchanger zone. This mode of operation is particularly advantageous when contaminated starting materials which could possibly lead to deposits in the heat exchanger system are to be used.

The important advantages of the process of the invention compared to a process without prior in-situ coating were demonstrated by the reactor described. Use of the process of the invention enables the reactor to be operated at higher temperatures compared to known standard processes without chemical attack on the graphite components having to be reckoned with. In the hydrogenation of STC, for example, this results in an increase in yield of the target product TCS.

It has surprisingly been found that despite the increased temperature, the heating elements and components which have been coated in situ have a significantly longer operating life than known heating elements. Analytical studies showed that corrosion of the graphite as a result of attack by water, HCl and chlorosilanes is significantly reduced in the case of the components which have been coated in situ. In the hydrogenation of STC, for example, far lower proportions of reaction products formed by reaction of the graphite, e.g. methyldichlorosilane and methyltrichlorosilane, are found.

The undesirable deposition of silicon on the heaters or components also no longer leads to destruction of the components, since the silicon does not diffuse through the protective SiC layer into the graphite.

This can now be utilized for a further advantageous configuration of the reaction parameters. Since the reaction can have a relatively large temperature gradient, the hot reaction gas can be cooled more quickly. As a result, the undesirable backreaction to the starting material in relatively colder reaction zones is avoided and the yield of the target product is increased. This is particularly advantageous when the cooling time from the reaction temperature to <700° C. in the reactor described is less than 0.1 s. The in-situ coating has been found to be advantageous here, since the free graphite surfaces catalyze the backreaction. The coating of, for example, SiC has been found to be catalytically inactive.

The following examples illustrate the invention.

EXAMPLE 1

Coating using a chlorosilane/$H_2$ mixture was carried out as first process step in a reactor as shown in FIG. 1. The progress of the coating process was monitored by means of the change of the resistance of the heating elements. The reactor was firstly brought to the target temperature (1300° C.) at a hydrogen throughput of 150 $m^3$/h at only a slightly superatmospheric pressure (1.5 bar). The chlorosilane was then fed in.

Over a period of 48 hours, the throughput of hydrogen was increased to 1500 m³/h and that of chlorosilane was increased to 5 metric t/h. Over this time, the pressure was increased to 6 bar. Silicon tetrachloride and purified hydrogen from the synthesis of TCS were used as starting materials.

The coating process was stopped after about 72 hours. Test specimens were taken and examined in terms of their chemical resistance as described in Example 3.

The thickness of the SiC layer on the structural elements was 10-100 μm (depending on the temperature at the particular deposition site). IR spectroscopy confirmed that this was SiC.

EXAMPLE 2

A reactor which had been coated as described in Example 1 and, for comparative purposes, a reactor with uncoated graphite components as was used in Example 1 were used under the following conditions for the hydrogenation of $SiCl_4$: Reactor temperature 900° C., pressure 5 bar, molar ratio of $H_2:SiCl_4=2:1$, $SiCl_4$ throughput 8 metric t/h.

The reactor with the uncoated components had to be shut down after a period of operation of less than 6 months. The reactor with the coated components was shut down after 12 months. The two reactors were compared after the end of the period of operation. The uncoated components displayed considerable corrosion and had to be discarded. The coated components showed barely any corrosion and could be reused for the next period of operation. The operating life of the coated reactor components had more than doubled compared to the components of the comparative reactor; the specific energy consumption per amount of TCS produced had been reduced by about 20%; and the introduction of impurities into the reaction product had been drastically reduced (methyltrichlorosilane from 200 ppm to about 20 ppm). In the reactor in which the process of the invention was carried out, the temperature could be increased to 1100° C. without problems and a 30% higher trichlorosilane yield could thus be achieved under these conditions.

EXAMPLE 3

The test specimens which had been coated in situ in the reactor (see Example 1) were compared with other test specimens. For this purpose, test specimens made of various materials were introduced into a reactor as shown in FIG. 1 in order to examine their chemical resistance under the conditions of the hydrogenation of $SiCl_4$ (1000° C., $H_2:SiCl_4=2:1$, duration of experiment 3 months).

The chemical resistance was estimated from the changes in the surface structure and the loss in mass of the test specimens. The results are summarized in Table 1.

TABLE 1

| Test specimens | Weight change | Surface |
| --- | --- | --- |
| Graphite parts coated in situ from Example 1 | +2.1% | unchanged |
| SiC-precoated graphite parts | +0.9% | unchanged |
| Graphite | +24% (due to Si uptake) | SiC deposition |
| Graphite/graphite fibers | −40% (part Si uptake, part decomposition) | SiC deposition |
| Ceramic based on $SiO_2$ | −100% | Completely decomposed |
| Ceramic based on $Al_2O_3$ | −100% | Completely decomposed |

No difference was found between the chemical resistance of the test specimens precoated with SiC and that of the test specimens which had been produced and coated in situ in the first step of the process of the invention. Compared to the components based on graphite, a lower loss in mass and thus a higher chemical resistance were observed. Although an SiC layer was also partly formed on the test specimens composed of graphite or graphite/graphite fibers, this was irregular so that corrosion could take place on these test specimens. Especially at contact points between the SiC layer and the free graphite surface, the material was severely attacked and some cracks were formed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the hydrogenation of a chlorosilane in a reactor comprising a reaction chamber having a surface which comes into contact with the chlorosilane and a heating element heated by electric current and which also has a surface which comes into contact with the chlorosilane, the reaction chamber and the heating element comprising graphite, comprising contacting an Si-containing compound and hydrogen with the surface of the reaction chamber and the surface of the heating element such that an SiC coating is formed in situ on the surface of the reaction chamber and the surface of the heating element in a first process step, and hydrogenation of chlorosilane is effected by heating of a chlorosilane/hydrogen mixture in the reaction chamber by means of the heating element in a second process step, with the first process step being carried out at a reaction temperature which is higher than the reaction temperature in the second process step.

2. The process of claim 1, wherein a compound of the formula $R_nSiCl_{4-n}$, where the radicals R are identical or different and are each hydrogen or an organic radical, and n is 0, 1, 2 or 3, is used as chlorosilane.

3. The process of claim 1, wherein a compound of the formula $X_3Si$—Y, where X=—H, —Cl or an alkyl radical and Y=H, Cl, —$SiX_3$ or —$OSiX_3$, is used as an Si-containing compound in the first process step.

4. The process of claim 1, wherein silane-containing by-products from the synthesis of trichlorosilane or the deposition of polycrystalline silicon by means of the Siemens process or methylchlorosilanes from the Müller-Rochow synthesis or waste products from the processes mentioned are used as Si-containing compound.

5. The process of claim 1, wherein the Si-containing compound and the hydrogen are fed into the reactor in a molar ratio (silane:hydrogen) of from 2:1 to 1:10.

6. The process of claim 1, wherein the Si-containing compound and the hydrogen are fed into the reactor in a molar ratio (silane:hydrogen) in a molar ratio of from 2:1 to 1:2.

7. The process of claim 1, wherein the first process step takes place at a reactor temperature of >1000° C.

8. The process of claim 1, wherein the first process step takes place at a reactor temperature of from 1000 to 1600° C.

9. The process of claim 1, wherein the first process step is carried out at a pressure of 1 to 20 bar.

10. The process of claim 1, wherein the first process step is carried out at a pressure of 1 to 5 bar.

11. The process of claim 1, wherein the first process step is regulated and controlled via measurement of the electric resistance of the heating elements.

12. The process of claim 1, wherein the second process step is carried out at a temperature of 700-1400° C.

13. The process of claim 1, wherein the second process step is carried out at a temperature of 900-1200° C.

14. The process of claim 1, wherein the second process step is carried out at a lower temperature and a higher pressure than the first process step.

15. The process of claim 1, wherein the starting materials chlorosilane and hydrogen are used in a ratio at which the hydrogen is present in excess.

16. The process of claim 1, wherein the starting materials chlorosilane and hydrogen are used in a ratio at which the hydrogen is present in a ratio of hydrogen:chlorosilane of from 1.5:1 to 5:1.

17. The process of claim 1, wherein the same starting materials are used in the first process step and in the second process step.

* * * * *